Jan. 13, 1942.  E. E. WEMP  2,269,966
VIBRATION DAMPENER
Filed Jan. 27, 1940  2 Sheets-Sheet 1

INVENTOR.
Ernest E. Wemp
BY Barnes, Kisselle, Laughlin & Raisch
Attorneys.

Jan. 13, 1942.  E. E. WEMP  2,269,966
VIBRATION DAMPENER
Filed Jan. 27, 1940   2 Sheets-Sheet 2

INVENTOR.
Ernest E. Wemp
BY
Barnes, Kisselle, Laughlin & Raisch
ATTORNEYS

Patented Jan. 13, 1942

2,269,966

UNITED STATES PATENT OFFICE 2,269,966

VIBRATION DAMPENER

Ernest E. Wemp, Detroit, Mich.

Application January 27, 1940, Serial No. 315,942

14 Claims. (Cl. 74—574)

This invention relates to a vibration dampener construction useful for dampening the vibrations in the crank-shaft of an engine. The structure of the invention is, of course, not limited to use with an engine, but may be used wherever a dampening action is desired.

The invention is directed to the provision of an improved vibration dampener which functions on the centrifugal head principle. In this connection a mass of divided material, which material preferably comprises metallic balls, is confined in a chamber in a rotating structure. This mass of material functions substantially as a liquid, the centrifugal head varying with the speed of rotation, and this variation in pressure is employed for the purpose of establishing a frictional engagement between relatively shiftable members of the vibration dampening arrangement. Thus a full range dampener is obtained in that the controlling pressure varies with the R. P. M., being relatively low at low R. P. M. and high at high R. P. M. A wide variation in frictional dampening is obtained to combat torsional vibration periods through all of its harmonics.

Among the objects of the invention is the provision of an improved simplified construction wherein one or more parts perform a dual function and which structure can be readily and cheaply produced, and which will nevertheless efficiently perform the operations of a full range vibration dampener. Other objects will become apparent as the detailed description progresses.

Fig. 1 is a cross sectional view of a structure for carrying out the invention and showing the position the parts assume at a low R. P. M., or during an at rest condition.

Fig. 2 is a partial cross sectional view showing the position of the parts at a higher R. P. M.

Figure 1:
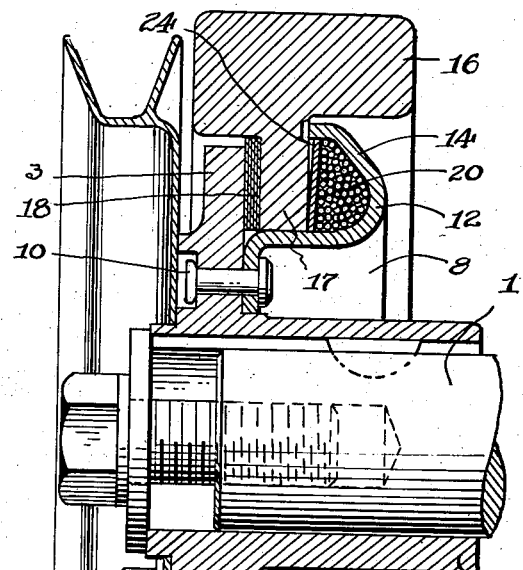

In Fig. 1 a shaft, such as the end of the crank-shaft of an internal combustion engine, is shown at 1, and non-rotatably secured thereto is a hub member 2 provided with a flange 3. The flange of the hub constitutes one of the frictional elements. Where, at the end of the crank-shaft of an engine, a driving arrangement is desired, a pulley 4 may be secured to the hub as by means of cap screws or the like, as illustrated at 5. The construction is admirably adapted for the reception of a pulley, but it is to be understood that the vibration dampening action can be obtained without regard to the pulley.

Secured to the hub 2 is a member generally indicated at 8. This member is advantageously of stamped or formed sheet metal of requisite thickness in order to give the desired strength. It has an inner flange 9 secured to the hub 3 by means such as rivets 10. This member has an axially extending part 11 disposed between the flange 9, and an arcuate portion 12 which has a reverse curve formation. A substantially straight but inclined part 14 extends angularly outwardly from the curved part 12 and axially back toward the flange 9, and the outer edge terminates preferably in an axially extending rim or edge portion 15.

The flange 3, as mentioned above, constitutes one member of the dampener, this being the member which rotates positively with the shaft while the other member is in the form of a weighted member 16 rotatable or rockable upon and centered by the portion 11, the member 16 having an inwardly extending flange-like part 17 for this purpose. Disposed between the overlapping flange 3 and part 17 is preferably a friction substance 18.

Thus it will be observed that the formation of the member 8 is such that a chamber 20 is formed in the reverse bend portion thereof, and the part 15 lies in close proximity to the adjacent surface of the member 16. The chamber 20 is substantially filled with the divided solid material which preferably comprises balls, advantageously of steel, as illustrated at 21. Also, in the chamber is a ring or washer spring element which may be in the form of a Belleville washer, as illustrated at 22. This spring element contacts with the member 16 at one of its peripheral edges, preferably the inner peripheral edge as shown at 23, while in a normal condition of the washer, its outer edge, as shown at 24, is spaced from the inverted member 16. The outer edge of the washer works or shifts along the inner surface of the part 15 with an adequate working clearance, but with such closeness as to confine the balls. Thus the washer forms one wall of the chamber, and in effect cooperates to complete and close the chamber.

Figure 4:
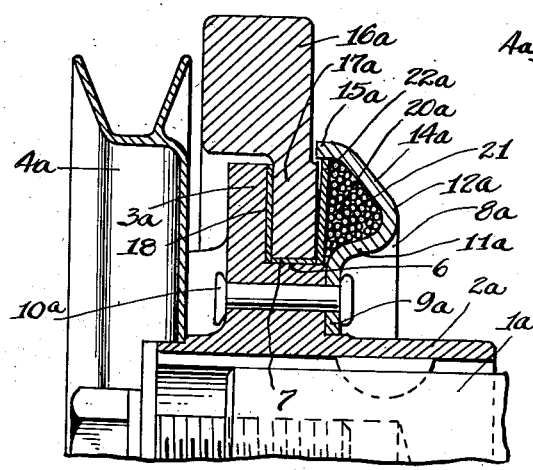
Fig. 4 is a partial cross sectional view similar to Fig. 2 showing a modified form of the invention.
Figure 5:
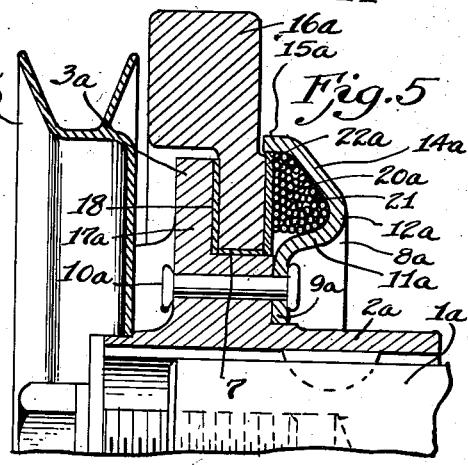
Fig. 5 is a view similar to Fig. 4 showing the parts of the modified form in a different position.

Before proceeding with the operation of this device, the modified form as shown in Figs. 4 and 5, may be described. In this form the shaft is shown at 1a, the hub keyed thereto at 2a with its flange 3a, while the pulley is shown at 4a. In this form the flange 3a is fashioned with an offset to provide a pilot 6 for the inertia member 16a. Friction material 18a is disposed between the overlapping portions of the flange 3a and the part 17a of the inertia member. Also, if desired, a suitable bearing substance 7 may be utilized between the pilot 6 and the inertia member 16a, although this feature is not necessarily exclusively characteristic of the modified form and can be eliminated, or can be used with the form shown in Figs. 1 and 2. The formed sheet metal member 8a has a flange 9a secured to the hub as by means of rivets 10a, and it is fashioned as at 11a, 12a and 14a to form a chamber 20 for the balls 21. The outer edge as at 15a is in close proximity to the member 16a, while a spring washer 22a which may be of the Belleville type is disposed in the same relative position as the washer 22 shown in Figs. 1 and 2. The inertia member 16a is shown as being comprised of a smaller mass than the inertia member 16, but, of course, this is subject to variation, and then, too, it will be noted that the inertia member 16a has an overall diameter greater than the member 16.

Figure 2:
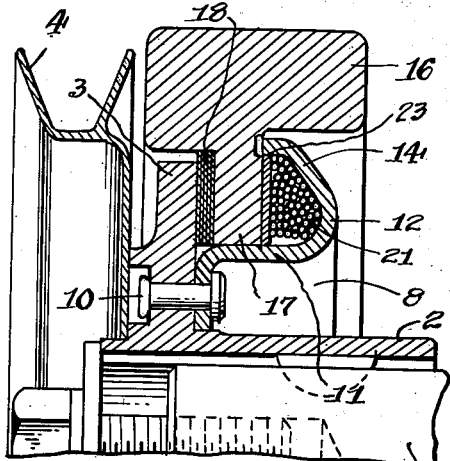
Figure 3:
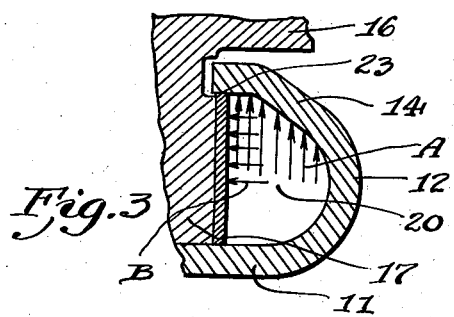
Fig. 3 is a diagrammatic view illustrating the direction change function.

The operation of the form shown in Figs. 1 and 2 is as follows, it being understood that the form shown in Figs. 4 and 5 functions in a similar manner. In an at rest condition the parts may take the position as shown in Fig. 1. At this time the spring 22 is under load and therefore loads and compacts the mass of divided material, the reaction of which is taken through the friction material 18, and thence to the flange of the hub. Accordingly, there is an initial frictional load. When the parts are rotating the mass of balls acts substantially in the manner of a fluid and creates a centrifugal head. The centrifugal force, as indicated in Fig. 3, is radially outwardly as indicated by the arrows A. The angular surface 14 functions as a direction changer for changing the direction of forces substantially into an axial direction, as indicated by the arrows B. The pressure, accordingly, is applied to the spring washer, and the pressure is in turn transmitted through the frictional engagement to the flange of the hub. At low R. P. M. the head pressure is relatively low, but it increases progressively with increase of R. P. M. In this action, with the centrifugal head pressure increasing, the force starts to collapse the spring and ultimately the operation may be to completely collapse the spring as shown in Fig. 2. Even though the spring is completely collapsed, the pressure continues to increase upon increase of R. P. M.

Figure 6:
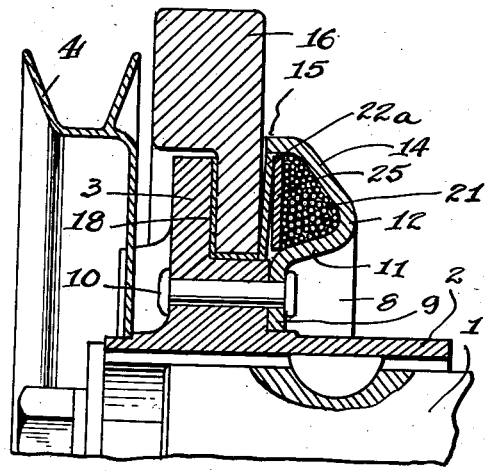
Fig. 6 is a sectional view taken through a dampener structure showing a further modified form.
Figure 7:
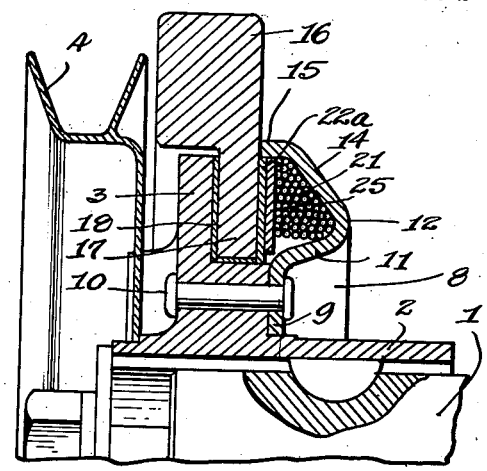
Fig. 7 is a detailed sectional view illustrating the form shown in Fig. 6 with some of the parts in a different position.

Since the spring is utilized as a wall of the confining chamber, its normally hardened surface will suffice for this purpose, and therefore no surface hardening is required in the portion 17 of the inertia member. It may be only necessary to locally harden the member 8 at the inner surface of its portion 14. The same general operation and advantages are present in the form shown in Figs. 4 and 5. The modified form shown in Figs. 6 and 7 embodies a structure which is applicable to the structure shown in Fig. 1 and also Fig. 4. Figs. 6 and 7 illustrate the general form shown in Fig. 4 with the further modified structure. Accordingly, the parts previously described bear the same reference characters as are used in Figs. 4 and 5. In this form an additional washer 25 is placed between the mass of balls and the spring washer. This washer is preferably hardened so as to present the desired surface to the balls.

In the normal position, as shown in Fig. 6, the outer peripheral edge of the washer 25 contacts with the outer peripheral edge of the spring washer 22a. As indicated in Fig. 6 the washer 25 is flat. However, in the further modified arrangement shown in Fig. 8, the additional hardened washer 26 may be slightly convexed after the manner of the spring washers 22 and 22a, with the outer peripheral edges engaging each other in their initial condition.

Figure 8:
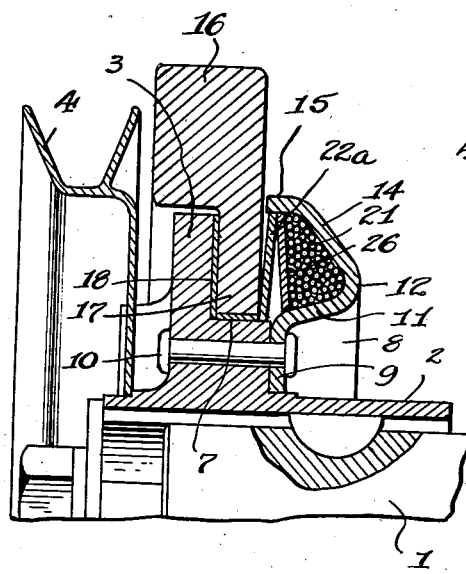
Fig. 8 is a view illustrating a still further modified arrangement.
Figure 9:
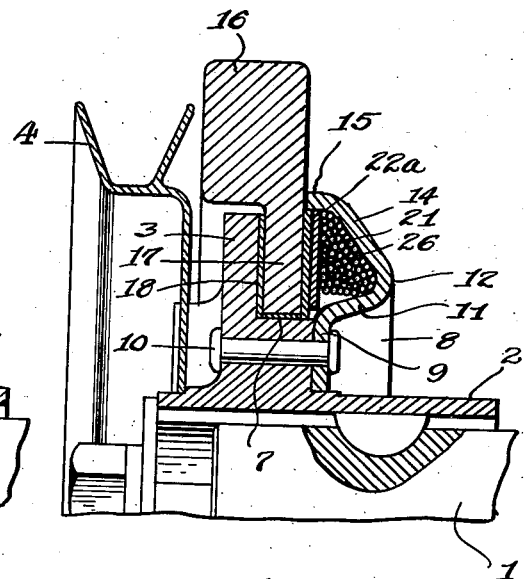
Fig. 9 is a view similar to Fig. 8 showing a different position of the parts.

The operation of these modified structures is substantially the same as the above described operations of the forms shown in Figs. 1 and 4. When the spring washer structure, as shown in Fig. 8, is collapsed under centrifugal head pressure, the relative positions may be as indicated in Fig. 9. The flat washer 25 may have, and preferably has, such a resistance to flexure that the spring washer 22 or 22a is completely collapsed against the surface of the inertia member before the washer 25 has been flexed to any appreciable degree. The washer 26 may be arranged to flex under centrifugal head, and to flatten against the spring washer 22a under adequate centrifugal head. In other words, the auxiliary washers 25 and 26 may or may not be arranged and utilized as yielding elements.

These auxiliary washers facilitate initial assembly as the washers may be placed on top of the balls and thus prevent the balls from getting out of position during the assembly of the other parts and the final riveting action. These washers also function in that they facilitate the calculation of the capacity of the Belleville spring 22a. The Belleville spring is loaded initially at its outside and inside diameters which is the usual condition for loading a Belleville spring, and the condition upon which the spring formulas are based. It will be appreciated that the Belleville spring washer is rather precisely loaded at its inside and outside diameter where these auxiliary washers are used, as distinguished from the case where the balls of the mass impinge directly over the major portion of the surface of the Belleville spring. The auxiliary rings 25 and 26 may be so constructed that the Belleville washer 22a remains loaded substantially at its inside and outside diameters throughout its flexing range and substantially until it is flattened against the inertia member.

The mass of material thus functioning substantially as a liquid may be termed a mechanical fluid. While the function of a fluid centrifugal head device is substantially obtained, yet there are no problems of sealing a fluid against leakage. The normal working clearances are quite adequate for this purpose. The structure can be easily initially balanced, as the spring places the mass of material under initial load. The material is preferably metal balls or shot and advantageously of steel, although, of course, the balls need not necessarily be spherical, but are preferably of a symmetrical nature.

The angularity of the direction changing surfaces 14 and 14a may be varied, although a 45° angle theoretically converts the forces into a true axial direction. With this arrangement the structure has been found to develop an efficiency of from 90 to 98% of the theoretical results of a frictionless fluid of the same weight per cubic foot as the shot or balls. The structure follows the law of a centrifugal head mechanism, and actual axial loads, at various R. P. M.'s have been obtained which were from 130 to 155% greater than the theoretically calculated loads of a straight centrifugal force device with centrifugal weights equal to the weight of the mass of mechanical fluid. The variation in the pressure gives a full range dampener action. In other words, there is a relatively light frictional pressure at low R. P. M. and a relatively heavy frictional pressure at high R. P. M., and the pressure progressively increases and decreases with increase and decrease of the R. P. M. The constituent elements of the mass are placed at random in a chamber and satisfactory results have been obtained with steel balls having a diameter of from .060 to .065 inch. It will be noted that there is very little movement or flow required of the substance, and it is believed that this arrangement is particularly useful where there is substantially no movement or flow, or a very limited movement or flow.

In some of the claims, the terms "ball" or "balls" are used in making reference to the mass of material which produces the centrifugal head. This is to be considered broadly and is not intended to limit the particles to its spherical shape, as the balls may be composed of a multiplicity of flat sides, or may be somewhat elongated or otherwise non-spherical. The balls may be used in a dry condition or may be used in a condition moistened with lubricant, which may lessen the interfacial friction. It has been stated above that the elements are somewhat of a symmetrical nature, and this statement is made in the sense that the particles are of such design that the mass has a certain fluidity without much tendency to pack together and maintain a geometrical shape.

I claim:

1. A vibration dampener for a shaft or the like comprising, a hub member secured to the shaft to rotate therewith, an inertia member capable of relative rotary movement and frictionally associated with the hub, means carried by the hub member and forming a chamber opening toward the inertia member, a mass of material comprising balls disposed in and substantially filling the chamber, means comprising a spring member positioned between the balls and the inertia member and reacting against the inertia member to place the material under initial load, the reaction establishing initial pressure for the frictional association of the hub and inertia member.

2. A vibration dampener for a shaft or the like comprising, a hub member fixed to the shaft and having a flange, an inertia member capable of relative rotary movement and having a part overlapping the flange with the flange and part disposed in frictional association, means fixed to rotate with the shaft and forming a circumferential chamber on the side of said part opposite the flange, a mass of material in the chamber comprising balls, and a spring washer between the mass of material and said part of the inertia member arranged to initially place the mass of material under load and reacting against said part of the inertia member to establish an initial pressure for the frictional association of the said flange and said part.

3. A vibration dampener for a shaft or the like comprising, a hub member fixed to the shaft and having a flange, an inertia member capable of relative rotary movement and having a part overlapping the flange with the flange and part disposed in frictional association, means fixed to rotate with the shaft and forming a circumferential chamber on the side of said part opposite the flange, a mass of material in the chamber comprising balls, and a spring washer between the mass of material and said part of the inertia member arranged to initially place the mass of material under load and reacting against said part of the inertia member to establish an initial pressure for the frictional association of the said flange and said part, the said chamber having an outer wall inclined toward the said part of the inertia member for changing the direction of forces of the mass of material incident to centrifugal force to substantially an axial direction.

4. A vibration dampener for a shaft or the like comprising, a hub member fixed to the shaft to rotate therewith and having a flange, an inertia member capable of relative rotary movement and having a part overlapping the flange on one side thereof, friction means between the flange and part, means secured to one of the said members and providing a chamber on the side of the said part opposite the flange, a mass of material in the chamber comprising balls, a wall of the chamber in its outer region being inclined toward the said part, and means including a spring in the form of a Belleville washer for substantially closing the chamber and reacting against the said part for placing the mass of material under initial load and to establish initial pressure on the friction means between the said flange and said part.

5. A vibration dampener for a shaft or the like comprising, a hub member fixed to the shaft to rotate therewith and having a flange, an inertia member capable of relative rotary movement and having a part overlapping the flange on one side thereof, friction means between the flange and part, means secured to one of the members and providing a chamber on the side of the said part opposite the flange, a mass of material in the chamber comprising balls, a wall of the chamber in its outer region being inclined toward the said part, a Belleville type spring washer between said part and said mass of material, and engaging said part substantially at its inner peripheral edge and extending angularly away from said part so that its outer peripheral edge is spaced therefrom, said spring being under initial load to compact the material in the chamber and to establish initial pressure on the said friction means between the said flange and said part, said washer being adapted to be flexed and substantially collapsed by centrifugal head pressure of the mass of material.

6. In a vibration dampener for a shaft or the like, an inertia member capable of rotary movement relative to the shaft, a member fixed to the shaft and fashioned to provide a circumferential chamber opening toward a side of the inertia member, a mass of material comprising balls disposed in and substantially filling the chamber, and a spring washer for closing the open side of the chamber and arranged to react against the inertia member.

7. In a vibration dampener for a shaft or the like, an inertia member capable of rotary movement relative to the shaft, a member fixed to the shaft and fashioned to provide a circumferential chamber opening toward a side of the inertia member, a mass of material comprising balls disposed in and substantially filling the chamber, a spring washer for closing the open side of the chamber and arranged to react against the inertia member, said spring washer being under initial load to compact the mass of material and reacting on the inertia member, and frictional means to which the reacting forces are transmitted.

8. A vibration dampener for a shaft or the like comprising, a hub element fixed to the shaft and having a flange, an inertia member capable of relative rotary movements, a third member fixed to the shaft and having an axially extending portion forming a pilot for the inertia member, the flange and inertia member having overlapping parts with friction material disposed therebetween, the third member being fashioned to provide a chamber on the side of the inertia member opposite the flange and opening toward the inertia member, a mass of material comprising balls in the chamber, and means including a spring washer for substantially closing the chamber and reacting against the inertia member.

9. A vibration dampener for a shaft or the like comprising, a hub element fixed to the shaft and having a flange, an inertia member capable of relative rotary movements, a third member fixed to the shaft and having an axially extending portion forming a pilot for the inertia member, the flange and inertia member having overlapping parts with friction material disposed therebetween, the third member being fashioned to provide a chamber on the side of the inertia member opposite the flange and opening toward the inertia member, a mass of material comprising balls in the chamber, means including a spring washer for substantially closing the chamber and reacting against the inertia member, said washer being initially under load to compact the mass of material and to establish initial pressure at the friction material between the flange and inertia member, and a wall of the chamber being disposed angularly relative to a radial plane to change the direction of centrifugal forces in the mass of material to a substantially axial direction for additionally loading the spring and for increasing the pressure of frictional engagement upon increase of R. P. M.

10. A vibration dampener for a shaft or the like comprising, a hub keyed to the shaft, said hub having a flange, a chamber forming member fixed to the hub and having a part extending axially from the flange and a reversely fashioned portion forming a circumferential recess opening toward the flange, an inertia member having a part disposed between the flange and said chamber, friction material between the flange and said part, a mass of material comprising balls in the chamber and a spring washer for substantially closing the circumferential chamber and reacting against said part of the inertia member to load the mass of material and to provide initial pressure at the friction material, the outer portion of the washer being normally spaced from said part of the inertia member and an outer part of the wall of said chamber being angularly disposed for changing radial forces of the mass of material incident to rotation into a substantially axial direction for further loading the spring and to increase the pressure of frictional engagement incident to increase of R. P. M.

11. A vibration dampener for a shaft or the like comprising, a hub keyed to the shaft, said hub having a flange with an offset portion forming a pilot, an inertia member having a part rotatable on the pilot and overlapping the flange, frictional material between the flange and said part, a member secured to the hub and fashioned to provide a circumferential chamber opening toward the inertia member, a mass of material comprising balls in said chamber, and a spring washer between the material and the inertia member and serving to substantially close the circumferential chamber and arranged to react upon the inertia member for the setting up of pressure at the frictional engagement between the flange and said part of the inertia member.

12. A vibration dampener for a shaft or the like comprising, a hub member secured to the shaft to rotate therewith, an inertia member capable of relative rotary movement and frictionally associated with the hub, means carried by the hub member and forming a circumferential chamber opening toward the inertia member, a mass of material comprising balls disposed in said chamber, a washer substantially covering said mass of material, and a spring washer disposed between the inertia member and the said washer and reacting against the inertia member to place the material under initial load with the reaction establishing pressure for the frictional association of the hub and inertia member.

13. A vibration dampener for a shaft or the like comprising, a hub member secured to the shaft to rotate therewith, an inertia member capable of relative rotary movement and frictionally associated with the hub, means carried by the hub member and forming a circumferential chamber opening toward the inertia member, a mass of material comprising balls disposed in said chamber, a washer substantially covering said mass of material, and a Belleville washer disposed between the inertia member and said washer and having substantially its inner and outer peripheral edges contacting one with the inertia member and the other with the washer.

14. A vibration dampener for a shaft or the like comprising, a hub member secured to the shaft to rotate therewith, an inertia member capable of relative rotary movement and frictionally associated with the hub, means carried by the hub member and forming a circumferential chamber opening toward the inertia member, a mass of material comprising balls disposed in said chamber, a washer substantially covering said mass of material, and a Belleville washer disposed between the inertia member and said washer and having substantially its inner and outer peripheral edges contacting one with the inertia member and the other with the washer, said washer being of concavo-convex form with its concave side facing the concave side of the Belleville washer.

ERNEST E. WEMP.